United States Patent [19]

Pöllinger

[11] 4,280,598
[45] Jul. 28, 1981

[54] BRAKE DISK

[75] Inventor: Hans Pöllinger, Munich, Fed. Rep. of Germany

[73] Assignee: Knorr-Bremse GmbH, Munich, Fed. Rep. of Germany

[21] Appl. No.: 49,918

[22] Filed: Jun. 19, 1979

[30] Foreign Application Priority Data

Feb. 13, 1979 [DE] Fed. Rep. of Germany ....... 2905385

[51] Int. Cl.³ ............................................ F16D 65/12
[52] U.S. Cl. .............................. 188/218 XL; 403/371
[58] Field of Search .............. 188/218 XL, 73.2, 71.1, 188/18 A, 264 AA, 264 A, 58, 59; 192/107 R; 403/371, 374, 337, 297

[56] References Cited

U.S. PATENT DOCUMENTS 3,994,370  11/1976  Gebhardt et al. ............. 188/218 XL
4,108,286   8/1978  Gagarin ........................ 188/218 XL
4,186,570   2/1980  Pokrandt ........................ 403/371 X

FOREIGN PATENT DOCUMENTS 1086093  7/1960  Fed. Rep. of Germany .
7202507  1/1972  Fed. Rep. of Germany .
 909971  9/1959  United Kingdom ............ 188/218 XL Primary Examiner—Douglas C. Butler
Attorney, Agent, or Firm—Edmund M. Jaskiewicz

[57] ABSTRACT

A brake disk particularly for railway vehicles has a brake disk annular element mounted on a hub by at least three radially extending adaptor sleeves seated in radially opposed bores in the hub and annular element. A conical member within an end portion of the adaptor sleeve can be moved inwardly by tightening a bolt passing through the adaptor sleeve so as to expand radially the end portion of the sleeve against the wall surface of its respective bore.

7 Claims, 3 Drawing Figures

BRAKE DISK

The present invention relates to a brake disk for disk brakes for rail and other vehicles, more particularly, to the sleeve structure for connecting a brake disk annular member upon a hub.

A known structure of a brake disk for a rail vehicle comprised an annular braking member radially positioned upon a hub and mounted to the hub by at least three radially extending and circumferentially spaced adaptor sleeves seated in aligned and opposed radial bores in the hub and annular member. Various forms of securing or locking structures are then provided to fix the axial position of the adaptor sleeves.

One form of such a brake disk is known form DE-PS No. 1 086 093 wherein a bolt passing axially through the bore of the adaptor sleeve holds in position washers on both ends of the sleeve and the outside diameter of these washers is greater than the adaptor sleeve diameter. These washers position the adaptor sleeve but enable the sleeve to have some axial displacement with respect to the hub and annular member as result of thermal expansion. This axial displacement produces an unpredictable behavior of the adaptor sleeve when there is thermal expansion of the friction disks of the annular member. The adaptor sleeve may shift with respect to the hub or the annular member or with respect to both the hub and annular member in an axial direction. Such an unpredictable shifting of the sleeve is undesirable both because of the construction of the brake disk and because of the materials employed in the different components. The situation would be much more favorable if the adaptor sleeve would not shift whatsoever with respect to the hub which is usually made of cast steel but only with respect to the annular member, which is usually made of cast iron or a similar material.

In order to prevent the adaptor sleeve from shifting axially with respect to the hub, it has been proposed to secure the sleeve in position by transverse or cross pin, such as disclosed in DE-GM No. 7 202 507. However, the arrangement of the cross pin is disadvantageous in that the actual mounting and securing of the cross pin requires considerable additional effort and structure which adds significantly to the cost of the brake disk. In addition, it is difficult to properly dimension the cross pin to enable the pin to withstand the high stresses to which it is subjected. A further disadvantage is that the adaptor sleeve in the region of the cross pin is subjected to a weakening which may cause damage to the holes or grooves which receive the cross pin.

It is therefore the principal object of the present invention to provide a novel and improved structure for mounting the annular member upon the hub of a brake disk for rail and other vehicles.

It is another object of the present invention to provide an adaptor sleeve for mounting the annular member upon a hub in such a manner that the sleeve is retained against axial displacement with respect to either the hub or the annular member such that the other component can shift with respect to the sleeve to compensate for thermal expansion.

According to one aspect of the present invention a brake disk for vehicles may comprise a brake disk annular element mounted on a hub by at least three radially extending and circumferentially disposed adaptor sleeves seated in radially opposed bores in the hub and annular element. The sleeves are axially positioned within the bores by means including a bolt passing axially through the sleeve. A conical member is positioned within an end portion of the sleeve and is engagable by the positioning means in such a manner that tightening of the positioning means radially expands the end portion of the sleeve against the wall surface of its respective bore hole.

The conical member may be threaded directly on the bolt so as to be movable by tightening of the bolt or the conical member may be engaged by a nut or the like threaded on the end of the bolt and moving the conical member inwardly to expand the sleeve upon tightening of the bolt.

Thus the present invention essentially comprises a radial expansion of an end portion of the adaptor sleeve by means of a concial structure which can be tightened by the bolt passing through the sleeve so as to force the expanded end portion of the sleeve against the inner wall of the bore. This tightened end portion of sleeve is thus fixed within its bore such that radial expansion is compensated by the relative shift of the other end of the sleeve with respect to either the hub or annular member of the brake disk.

Other objects and advantages of the present invention will be apparent upon reference to the accompanying description when taken in conjunction with the following drawings which are exemplary, wherein.

Proceeding next to the drawings wherein like reference symbols indicate the same parts throughout the various views a specific embodiment and modifications of the present invention will be described in detail.

Figure 1:
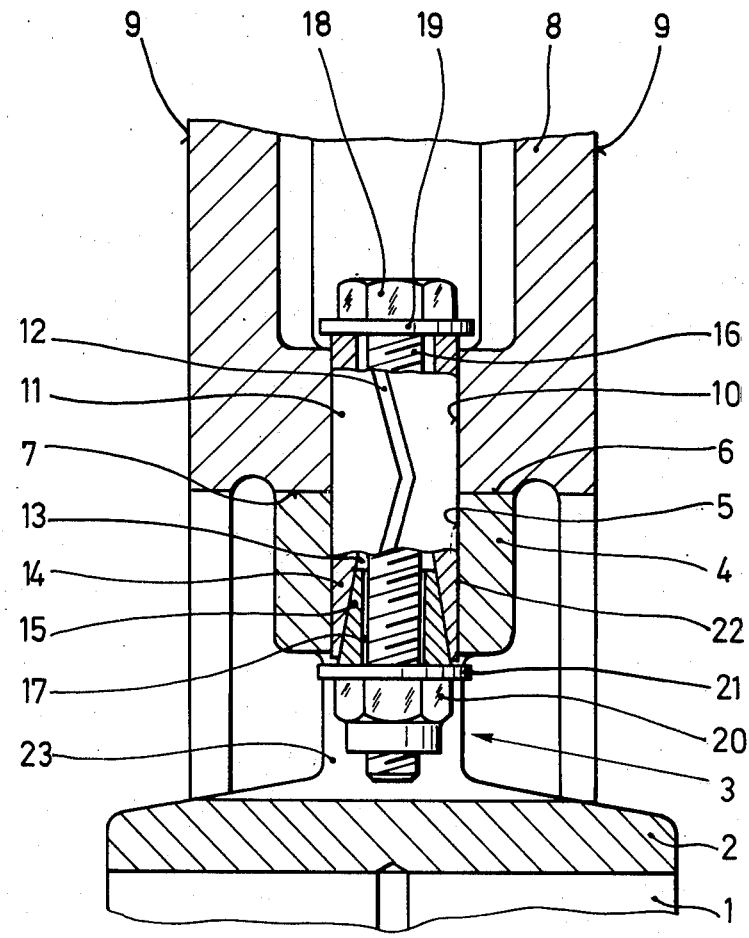
FIG. 1 is a radial sectional view of one half of a brake disk incorporating the adaptor sleeve construction according to the present invention to mount the annular member upon the hub.
Figure 3:
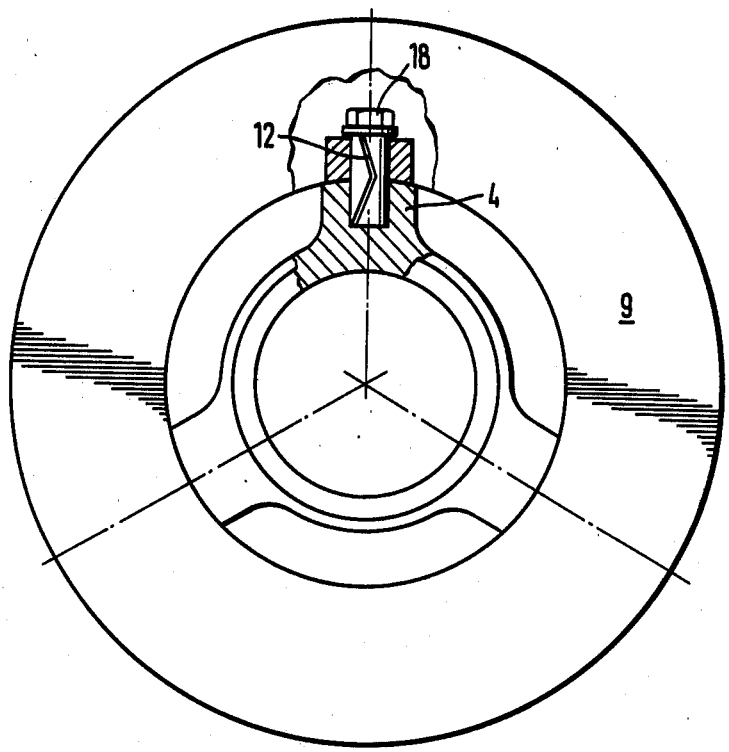
FIG. 3 is an elevational view with a portion thereof in section showing the adapter sleeve of the present invention and the mounting of three such adapter sleeves in the brake disk.

As may be seen in FIG. 1, a hub or carrier member 2 is non-rotatably mounted in a known manner upon an axle or shaft, which is not shown, but passes through a bore 1 of the hub. An annular flange 3 projects radially from the hub 2 and has at least three enlarged portions or bosses 4 uniformly spaced over the circumference of the flange 3 as shown in FIG. 3. Each boss 4 is provided with a radially extending bore 5 which passes through the boss so as to be open on both sides thereof.

The outer peripheral surface of the flange 3 defines a cylindrical surface 6 which is coaxial to the bore 1. Supporting on the peripheral surface 6 at least upon the peripheral surfaces of the enlarged portions 4 is an inner cylindrical surface 7 of a brake disk annular member 8 having opposed lateral surfaces 9 against which brake shoes are applied in opposite directions in a manner known in the art. The lateral surfaces 9 function as the braking surfaces of the brake disk.

The cylindrical inner surface 7 of the annular member 8 is spaced radially a very small distance from the cylindrical surface 6 as defined by the enlarged portions 4 of the hub.

Portions of the annular member 8 which are adjacent to the enlarged portions 4 are provided with radial bores 10 which are also open at both ends and aligned with the bores 5 in the hub 2. An adaptor sleeve 11 is seated in each aligned pair of bore holes 10 and 5 and is of such a length that short portions of the sleeve protrude from the ends of the respective bore holes 5 and 10, as shown in FIG. 1. Each sleeve 11 is constructed so as to be capable of radial expansion and for this purpose, a substantially V-shaped longitudinal slot 12 is provided in the wall of the sleeve.

The sleeve 11 is provided with a central bore 13 which is substantially cylindrical and at one end of the bore there is provided a substantially conical space 14 to accommodate a conical member 15 whose tapering outside surface conforms substantially to the taper of the conical portion 14. The conical member extends slightly outwardly from the end of the adaptor sleeve facing toward the hub 2 and extends radially inwardly to the interior of the sleeve.

A bolt 16 concentric to the sleeve 11 passes through the bore 13 of the sleeve and through an axially extending bore 17 within the conical member 15. The bolt 16 has a head 18 which is supported upon a washer 19 against the radial outward end surface of the adaptor sleeve 11. A nut 20 is threaded upon the end of the bolt directed toward the hub 2 against a washer 21 which bears against the projecting end of the conical member 15. The outside diameter of the washers 19 and 21 is greater than the outside diameter of the adaptor sleeve 11 when it is inserted in the bores 5 and 10 with a radial prestress. Suitable means as known in the art are provided for securing the nut 20 against loosening and becoming separated from the bolt 16.

When the bolt 16 is tightened, the nut 20 will be drawn radially outwardly as viewed in FIG. 1 to urge washer 21 against the projecting end of the conical member 15. The conical member 15 then moves axially into the sleeve 11 and by means of conical member conical surfaces 22 acting against conical surfaces 14 the end portion of the sleeve 11 is expanded radially. Since this expanded end portion of the sleeve 11 is positioned within the bore 5 of the enlarged portion 4 of the hub, the sleeve 11 will be subjected to a sufficient radial prestress so as to be fixed within the bore 5.

As a result of braking operations, the annular member 8 which is made of cast iron, gray cast iron or a similar material, will be subject to thermal expansion and the annular member 8 will shift or be displaced in a direction parallel to the axial direction of the adaptor sleeve 11. At the same time, the sleeve 11 itself is almost rigidly positioned within the bore 5 of hub 2 as result of the radial prestress exerted by the conical member 15. The hub 2 is preferably made of cast steel, as known in the art. Thus, a sliding movement will occur only between the sleeve 11 and the annular member 8 which, because of their respective materials provides favorable friction conditions. On the other hand, there will be no relative displacement between the sleeve 11 and the hub 2 and this is advantageous because the materials of the sleeve and hub are unfavorable with respect to friction between each other.

The increased radial force between sleeve 11 and enlarged member 4 of the hub 2 also secures the sleeve 11 against any displacement radially inwardly or outwardly with respect to the annular member 8. An additional preventive measure against such shifting is provided by the washers 19 and 21 which will abut annular member 8 or enlarged portion 4 in the event of excessive axial shifting of the sleeve 11.

Figure 2:
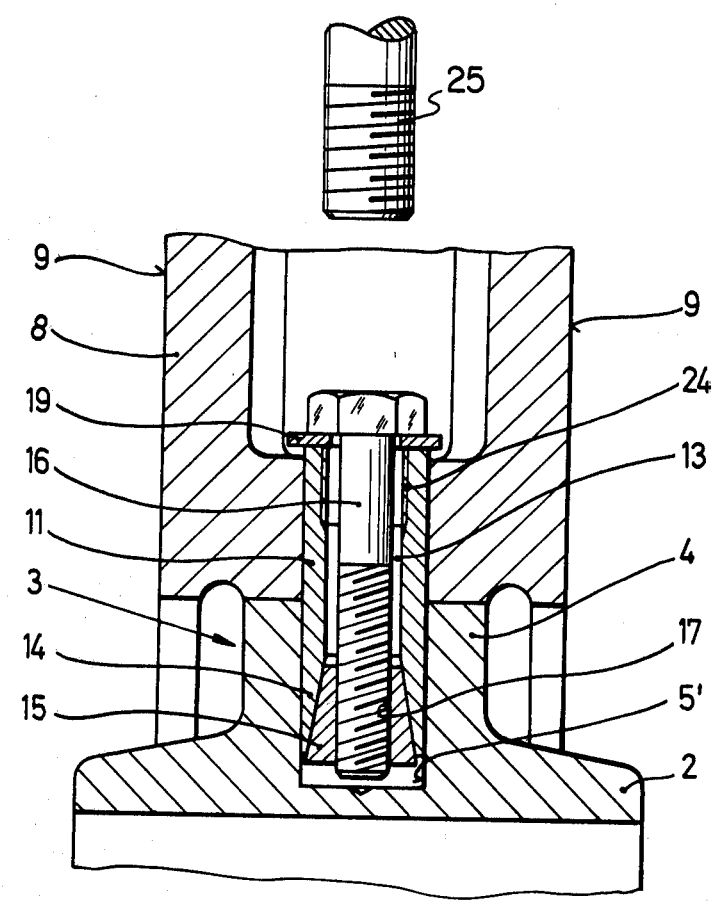
FIG. 2 is a view similar to that of FIG. 1 but showing a modification thereof.

In the modification of FIG. 2, the bore 17 of the conical member 15 is threaded so as to be screwed upon the end of the bolt 16. This eliminates the necessity for nut 20 and washer 21 as disclosed with respect to FIG. 1. The enlarged portion 4 of the hub 2 is provided with a bore 5' whose radially inner end is closed, as can be seen in FIG. 2. In addition, the opening 23 in the flange 3 to accommodate the nut 20 is also eliminated in the construction of FIG. 2.

The adaptor sleeve 11 of FIG. 2 is similarly provided with a cylindrical bore 13 the end of which is connected to a conical surface 14. The open end of the cylindrical bore 13 is provided with an internal thread 24 into which may be screwed a part of a suitable extraction mechanism or tool 25 for removing the sleeve 11 from the bores 5 and 10. In all other respects the construction of FIG. 2 is similar to that of FIG. 1.

In FIG. 2, as the bolt 16 is tightened, the conical member 15 will be drawn axially into the sleeve 11 against the conical surfaces 14 and cause this lower end portion of the sleeve 11 to expand radially outwardly into snug engagement with the surface of the bore 5'.

As result of this construction of the sleeve, the inner end of the sleeve 11 will be tightly secured within the bore hole of the hub so that its resistance to any shift with respect to the hub is substantially increased. Thus, any thermal expansion which occurs will be compensated by the relative shift of the annular member with respect to the adaptor sleeve. It is thus possible that relative shifting will occur only between the adaptor sleeve and that component of the brake disk which is better designed with respect to slip behavior and friction characteristics on the basis of their respective materials of construction. On the basis of the conventional materials from which hubs and annular members are constructed, it is particularly advantageous if the end of the adaptor sleeve in the bore hole of the hub is radially expandable. However, it is to be understood that the radially outer end of the adaptor sleeve, or the end received within the bore of the annular member can also be constructed so as to be radially expandable and fixed within the bore of the annular member.

Because of the force exerted by the conical member drawn against the conical surface in the sleeve, the sleeve in its expanded area becomes substantially a rigid or fixed bolt as result of which the adaptor sleeve is securely and safely mounted within the respective one of the hub or annular member. This is true even when the annular member being subjected to braking pressure is stressed dynamically. There is thus a reduction of wear between the connection of the hub and annular member through the adaptor sleeve and the operating or service life of the annular member is thus significantly increased. Also, because of the pressing force exerted between the adaptor sleeve and preferably the hub, the adaptor sleeve is also prevented from shifting radially inwardly as well as radially outwardly and thus the adaptor sleeve is retained in its intended or ideal position without any weakening.

It will be understood that this invention is susceptible to modification in order to adapt it to different usages and conditions, and accordingly, it is desired to comprehend such modifications within this invention as may fall within the scope of the appended claims.

What is claimed is:

1. A brake disk for vehicles comprising a hub, a brake disk annular element mounted on said hub, at least three radially extending and circumferentially disposed adaptor sleeves seated in radially opposed bores in said hub and annular element, each of said sleeves having one end portion in the hub bore and another end portion in the annular elements bore, means including a bolt passing axially through a said sleeve for positioning axially said sleeves within said bores, and a conical member within one of said end portions of a said sleeve and engagable by said positioning means such that tightening of said positioning means radially expands said one end portion of said sleeve against the wall surface of its respective bore to fix said one end portion within its bore so that radial expansion is compensated by the relative shifting of the other end portion of the sleeve with respect to one of the hub or annular member of the brake disk.

2. A brake disk as claimed in claim 1 wherein said conical member is disposed within the end portion of a said sleeve within a bore in the hub.

3. A brake disk as claimed in claim 1 wherein said sleeve end portion has an inner surface tapering outwardly to receive said conical member, said bolt having a head end axially positioned on another end portion of said sleeve and another end engageable with said conical member such that tightening of said bolt moves said conical member to expand radially said sleeve end portion.

4. A brake disk as claimed in claim 3 wherein said adaptor sleeve has a cylindrical bore and said tapered surface connects to said cylindrical bore.

5. A brake disk as claimed in claim 4 wherein said cylindrical bore of said adaptor sleeve is threaded to receive an extraction tool.

6. A brake disk as claimed in claim 3 wherein said other end of said bolt is threaded and said conical member is screwed on said threaded end such that tightening of said bolt moves said conical member to expand said sleeve end portion.

7. A brake disk as claimed in claim 3 wherein said other end of said bolt is threaded, and means on said threaded bolt end engaging an end of said conical member to move said conical member to expand said sleeve end portion upon tightening of said bolt.

* * * * *